US005894538A

United States Patent [19]
Presby

[11] Patent Number: 5,894,538
[45] Date of Patent: Apr. 13, 1999

[54] METHOD OF FORMING INTEGRATED OPTICAL CIRCUIT PLANAR WAVEGUIDE TURNING MIRRORS

[75] Inventor: Herman Melvin Presby, Highland Park, N.J.

[73] Assignee: Lucent Technologies Inc., Murray Hill, N.J.

[21] Appl. No.: 08/932,935

[22] Filed: Sep. 17, 1997

[51] Int. Cl.⁶ .................................................. G02B 6/10
[52] U.S. Cl. ........................ 385/129; 385/130; 385/123; 385/14
[58] Field of Search ...................... 385/129, 130, 385/131, 132, 133, 3–8, 14, 123–128; 372/42, 45, 48, 50

[56] References Cited

U.S. PATENT DOCUMENTS

| | | | |
|---|---|---|---|
| 4,624,000 | 11/1986 | Streifer et al. | 372/45 |
| 4,750,799 | 6/1988 | Kawachi et al. | 350/96.11 |
| 5,135,605 | 8/1992 | Blonder et al. | 156/628 |
| 5,719,981 | 2/1998 | Katoh et al. | 385/129 |

OTHER PUBLICATIONS

C.H. Henry et al., "Glass Waveguides on Silicon for Hybrid Optical Packaging", 7 *J. Lightwave Technol.*, pp. 1530–1539 (1989).

H.M. Presby, "Silica Integrated Optical Circuits", (SPIE Optical Engineering Press, Bellingham, WA 1996).

*Primary Examiner*—Phan T. H. Palmer
*Attorney, Agent, or Firm*—Robert E. Rudnick

[57] ABSTRACT

Planar waveguide turning mirrors in integrated optical circuits are formed using at least one light beam including a wavelength in a particular wavelength range that is absorbed by the cladding layer of the circuit to vaporize a particular region of the corresponding cladding layer at the desired angle to form the recessed light deflector surface of the turning mirror. In addition, it is also possible to form the cladding layer on a substrate comprising a material that enables light wavelengths in the particular wavelength range to be substantially transmitted through the substrate to advantageously enable greater flexibility in the light beam energy and/or the time the beam is incident on the cladding layer during the vaporization process.

13 Claims, 3 Drawing Sheets

METHOD OF FORMING INTEGRATED OPTICAL CIRCUIT PLANAR WAVEGUIDE TURNING MIRRORS

FIELD OF THE INVENTION

The invention is directed to integrated optical circuits, such as silica optical circuits, and more specifically, to a method for forming turning mirrors for planar waveguides contained therein.

BACKGROUND OF THE INVENTION

Integrated optical devices for directly processing optical signals have become of greater importance as optical fiber communications increasingly replace metal cable and microwave transmission links. Integrated optical devices can advantageously be implemented as silica optical circuits having compact dimensions at relatively low cost. Silica optical circuits employ integrated glass waveguide structures formed on silicon substrates. The basic structure of such devices is described in C. H. Henry et al., "Glass Waveguides on Silicon for Hybrid Optical Packaging", 7 *J Lightwave Technol.*, pp. 1530–1539 (1989) (Henry et al. reference), which is herein incorporated by reference.

Typically, in silica optical circuits, a silicon substrate is provided with a base layer of $SiO_2$, and a thin core layer of doped silica glass is deposited on the $SiO_2$ layer. The core layer can be configured to a desired waveguide structure using standard photolithographic techniques. Then, a layer of doped silica glass is deposited over the core layer to act as an upper cladding. Further, numerous passive optical circuit components have been formed within conventional silica optical circuits to desirably provide signal processing in addition to optical signal routing within the silica optical circuit structure. Examples including, for example, low-pass, high-pass, band-pass and notch filters, couplers, multiplexers and demultiplexers. Configurations of typical passive optical components formed within silica optical circuits are described in, for example, H. M. Presby, "Silica Integrated Optical Circuits" (SPIE Optical Engineering Press, Bellingham, Wash. 1996).

However, typical optical circuit applications require passive as well as active devices, such as optical signal detectors and transmitters as well as modulators. In order to provide such applications, conventional optical circuits often interconnect active devices with passive optical devices formed within silica optical circuits using optical fibers. In such configurations, waveguides extend to edge surfaces of the silica optical circuits where edge connectors attach the optical fibers. However, the attachment of the edge connectors undesirably increases circuit fabrication costs and the resulting configuration is typically undesirably larger than the silica optical circuit requiring greater space in an associated optical system.

U.S. Pat. Nos. 5,135,605 and 4,750,799 describe fabrication techniques for producing hybrid integrated optical circuits in which active optical components are mounted on a top surface of a silica optical circuit. These hybrid integrated optical circuits have relatively compact dimensions compared to the previously silica optical circuits interconnected with active devices by optical fibers. In the hybrid integrated optical circuits, turning mirrors are positioned under a mounted active device and proximate an end of a planar waveguide to enable an exchange of optical signals between the active device and the planar waveguide. Conventional turning mirrors have reflective surfaces positioned opposite an end surface of the planar waveguide and at a 45° angle relative to the direction of the waveguide as well as a top surface of the circuit.

A cross-sectional side view of an exemplary optical circuit 1 having a conventional turning mirror configuration 5 is illustrated in FIG. 1. In FIG. 1, a planar waveguide 10 is formed between respective cladding layers 15 and 20. The cladding layer 20 is disposed on a substrate 25, such as a silicon substrate. The turning mirror 5 is also positioned on the substrate 25 and has a reflective surface 7 at a 45° angle relative to the waveguide 10. A device 30, such as an optical signal detector and/or transmitter, is positioned on the mirror 5 and cladding layer 15. The device 30 is positioned to transmit an optical signal that deflects off the mirror surface 7 and into the waveguide 10 or receive an optical signal propagating through the waveguide 10 that is reflected by the mirror surface 7. An exemplary path for a light signal to travel between the device 30 and planar waveguide 10 is depicted by dashed line 35.

In accordance with the hybrid integrated optical device fabrication technique of U.S. Pat. No. 4,750,799, prefabricated mirror and waveguide components are secured to the substrate. However, such a fabrication technique is prohibitively expensive in a mass fabrication environment. In contrast, the fabrication technique of U.S. Pat. No. 5,135,605 more advantageously forms cladding and planar waveguide layers on a substrate. Then, a multi-step etching process is employed to create the profile of the turning mirror reflecting surface and waveguide end surface at the desired positions in the circuit. Such an etching technique reduces circuit fabrication costs as well as enables the formation of a greater number of turning mirrors in area of the integrated optical circuit.

Nevertheless, a need exists for less complex turning mirror fabrication techniques that can be implemented at relatively low cost.

SUMMARY OF THE INVENTION

A technique for forming planar waveguide turning mirrors in integrated optical circuits employs a light beam providing sufficient energy in a particular wavelength range to vaporize a region of the cladding layer for forming the recessed deflector surface of the turning mirror. More specifically, the invention is based on the realization that typical materials used for integrated optical circuit cladding layers, such as silica glass or lithium niobate, substantially absorb light of particular wavelength ranges and that such light absorption is useable with a light beam of sufficient energy to vaporize regions of the cladding layer for forming the turning mirror. Thus, a light beam of sufficient energy in the particular wavelength range is directed incident on a region of a cladding layer to substantially vaporize the cladding layer in that region for forming the turning mirror.

The particular angle of the incident light beam is selected such that the resulting recess in the cladding layer produced by the vaporization has an edge surface that provides the desired angled deflector surface of the turning mirror. The formed angled deflector surface is capable of deflecting a light signal between the waveguide and an optical device or other integrated optical circuit. The invention advantageously enables formation of recessed turning mirrors substantially independent of the dopant materials employed.

This advantageous method is useable for forming turning mirrors of a conventional type such as, for example, the turning mirror depicted in FIG. 1. For such a turning mirror configuration, it is possible to direct the vaporizing light beam incident on the cladding layer at the particular angle to form the turning mirror deflector surface and then to direct the beam incident on the cladding layer perpendicular to the planar waveguide to form the end surface of the waveguide. It is further possible to use this fabrication process for forming other turning mirror configurations including, for example, the advantageous turning mirror configuration of the commonly-assigned patent application entitled "INTEGRATED OPTICAL CIRCUIT HAVING PLANAR WAVEGUIDE TURNING MIRRORS", co-filed herewith by D. Marcuse and H. M. Presby.

In accordance with another aspect of the present invention, the cladding layer is formed on a substrate made of a material that enables a light beam in the particular wavelength range used to vaporize the cladding layer to be substantially transmitted through the substrate. For example, if a silicon substrate is used with a silica glass cladding layer, then approximately 100% of light having a wavelength in the range of 5 µm and 12 µm is absorbed by a silica glass cladding layer while approximately 75% of such light is transmitted through the substrate. Thus, it is possible to create the turning mirror recess according to this aspect of the invention with greater flexibility in the light beam energy and the time the beam is incident on the cladding layer during the vaporization process. Such flexibility is achieved because upon vaporizing substantially the entire cladding layer in the turning mirror region, the light beam becomes incident on the substrate causing little or no vaporization as a result of the light being substantially transmitted through it. Accordingly, this method enables relatively rapid turning mirror formation at relatively low cost.

Additional features and advantages of the present invention will become more readily apparent from the following detailed description and accompanying drawings.

DETAILED DESCRIPTION

The invention is based on the realization that typical materials used for cladding layers of integrated optical circuits, such as silica glass or lithium niobate, substantially absorb light of particular wavelength ranges. Accordingly, the invention uses a light beam having sufficient energy in an absorption wavelength range for vaporizing regions of an integrated optical circuit cladding layer to provide recessed edge surfaces useable as turning mirrors for planar waveguides contained therein. More specifically, such a light beam is directed at a particular angle to the cladding layer to produce a recess having an angled edge surface proximate the planar waveguide to provide a turning mirror deflector surface.

Figure 2:
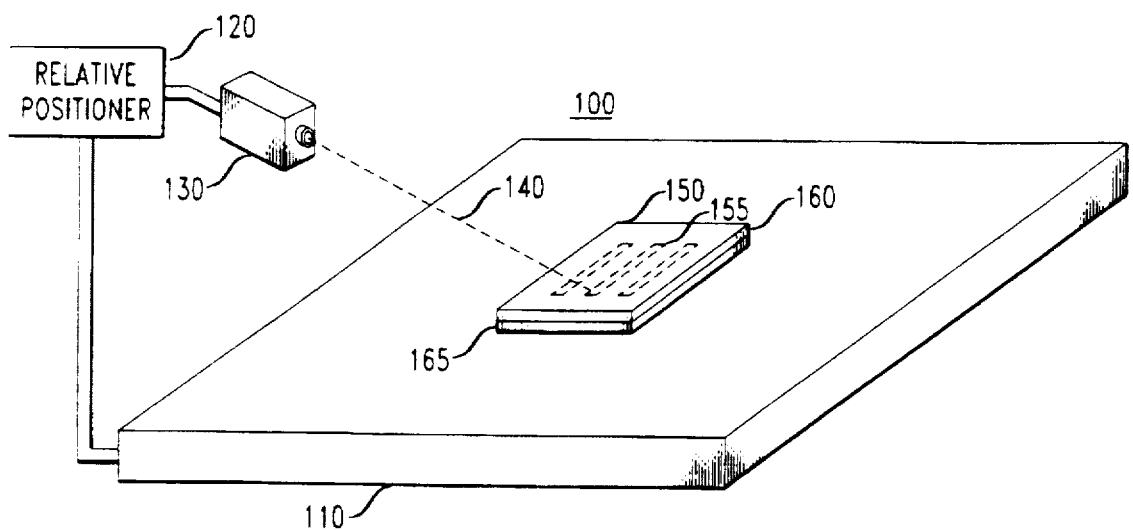
FIG. 2 illustrates a perspective view of an exemplary apparatus for performing the turning mirror fabrication method in accordance with the invention.

An exemplary apparatus 100 for forming planar waveguide turning mirrors in an integrated optical circuit 150 according to the invention is depicted in FIG. 2. The apparatus 100 has been depicted for illustration purposes only. It should be readily understood that numerous other apparatus configurations are useable for forming planar waveguide turning mirrors in accordance with the invention.

Referring to FIG. 2, the apparatus 100 has a base 110 coupled to at least one relative positioner device 120 that is further coupled to a corresponding light source, such as a laser 130. The components of the apparatus 100 have not been drawn to scale for ease of illustration. The relative positioner device 120 is controllable for positioning the laser 130 relative to the base 110 to direct a light beam 140 at a particular region of the integrated optical circuit 150 at a desired angle. The integrated optical circuit 150 contains at least one planar waveguide 155 formed within a cladding layer 160 of, for example, silica glass or lithium niobate, that is disposed on a substrate 165.

In accordance with the invention, the laser 130 produces the light beam 140 having at least one wavelength in a particular wavelength range that is substantially absorbed by the material of the cladding layer 160. For example, approximately 100% of light having a wavelength in the range of 5 µm and 12 µm is advantageously absorbed by silica glass. As a consequence, it is possible for the light beam 140 to provide sufficient energy in that wavelength range wherein the corresponding light absorption causes vaporization at the region of a silica glass cladding layer 160 exposed to the light beam to produce the turning mirror in an efficient manner. An exemplary light source 130 for producing a light beam having at least wavelength in that wavelength range is a conventional beam $CO_2$ laser. It is further possible to use various types of lasers according to the invention including, for example, pulse or continuous beam lasers. However, the use of a laser for the light source 130 is not critical to practicing the invention and it is possible to employ other types of light sources that produce a light beam with sufficient energy in the required absorption wavelength range.

Moreover, the use of a light source 130 with greater energy in the particular wavelength range will result in more rapid vaporization of and recess formation in the cladding layer 160 relative to the use of light sources generating less energy. An exemplary $CO_2$ laser having a power in the range of 10 to 100 W enables vaporization of a silica glass cladding layer at a rate of approximately 1 to 10 µm/sec. However, a light source of greater or lesser power is also useable according to the invention with a corresponding increase or decrease in vaporization rates.

The particular method employed for fabricating the silica optical circuit 150 in which turning mirrors are to be formed is not critical to practicing the invention. An exemplary fabrication process for the silica optical circuit 150 is as follows: a base layer of silica glass is deposited on the substrate 165, such as a silicon substrate using, for example, low pressure vapor chemical deposition or flame hydrolysis; and then a thin core layer of doped silica glass is deposited on this silica glass layer; the core layer is then configured to the desired structure of the waveguide 155 using standard photo-lithographic techniques, such as lithography, etching; and a layer of doped silica glass is then optionally deposited over the core layer to act as an upper cladding. A suitable doping profile for the doped silica glass is a uniform step-index distribution. While the proceeding description relates to silica-on-silicon waveguide devices, it should be understood that it is possible to fabricate the circuit on other substrate materials including, for example, fused quartz, ceramic or III-V materials, such as InP or GaAs.

The upper cladding and the base layer of silica glass form the silica glass cladding layer 160 of FIG. 2. Suitable thicknesses for the base silica layer, core layer and top cladding layer are 10 to 20 μm, 4 to 8 μm and 0 to 20 μm, respectively. Thicknesses less than 10 μm for the base silica layer are undesirable because of light loss to the substrate while thickness greater than 20 μm are generally disadvantageous because of long deposition times required to form such thicknesses. For a detailed discussion of glass waveguides on silicon and the fabrication thereof, see, for example, C. H. Henry et al., "Glass Waveguides on Silicon for Hybrid Optical Packaging", 7 *J Lightwave Technol.*, pp. 1530–1539 (1989), which is incorporated by reference herein. Although the above exemplary fabrication method produces a waveguide within the silica glass 160 that is completely buried, it is possible to fabricate such a waveguide within the silica glass 160 forming a portion of a silica glass top surface or which are only partially buried.

An exemplary method for forming the turning mirror configuration 5 of FIG. 1 according to the invention will be described with regard to the apparatus 100 and the various stages of completion of an integrated optical circuit turning mirror depicted in FIGS. 3A, 3B, 3C and 3D (3A–3D). Identical components in FIGS. 2 and 3A–3D are indicated by like reference numbers for clarity, for example, integrated optical circuit 150, planar waveguide 155 and laser 130. Further, in FIGS. 3A and 3C, the relative positioner 120 and base 110 have not been shown and only the laser 130 has been shown for the apparatus 100 for ease of illustration.

Figure 3A:
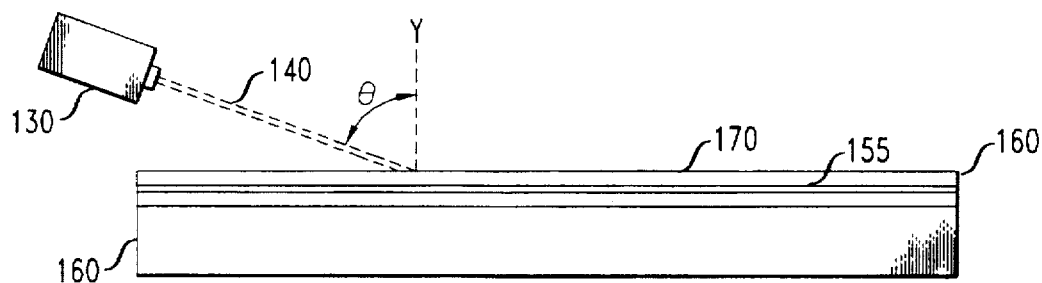
FIGS. 3A, 3B, 3C and 3D illustrate cross-sectional views of various stages of the formation of an exemplary integrated optical circuit turning mirror in accordance with the invention using the apparatus of FIG. 2.
Figure 3B:
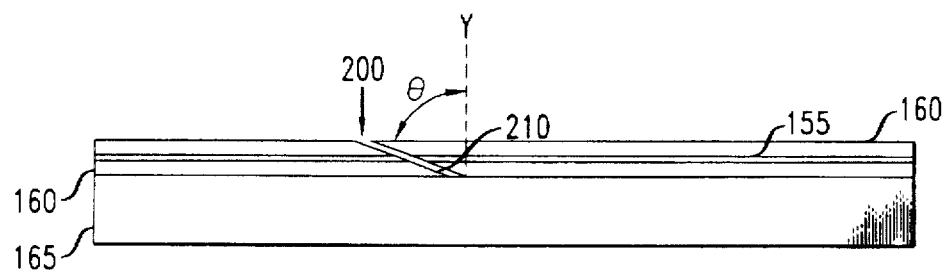
Figure 3C:
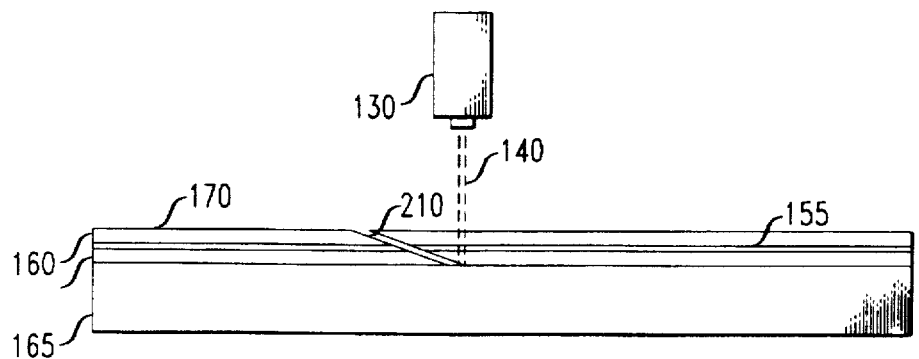

Referring to FIG. 3A, the laser 130 directs the light beam 140 incident on a particular region of the integrated optical circuit 150 proximate the planar waveguide 155. The light beam 140 is directed at the region at a particular angle θ relative to a Y-axis extending perpendicular to a surface 170 of the circuit 150. The light beam 140 is also directed incident on the silica glass cladding 160 with sufficient energy in the particular wavelength range and for a sufficient duration to vaporize the silica glass in the region for producing an angled recess 200 at the angle θ that extends through the planar waveguide 155 as is shown in FIG. 3B. A formed edge surface 210 of the angled recess 200 will provide the deflection surface 7 of the turning mirror configuration 5 in FIG. 1.

Figure 3D:
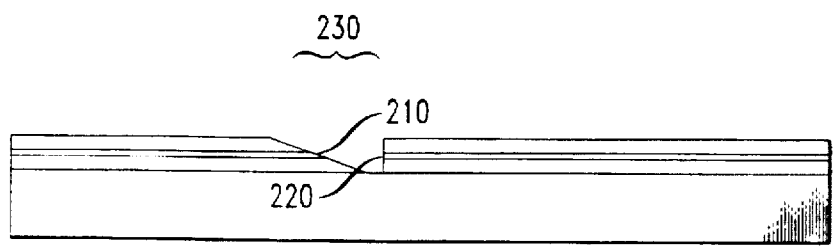

The laser 130 is then re-directed incident on the cladding layer 160 at an orientation to be perpendicular to the surface 170 at another particular region covering the planar waveguide 155 for vaporizing the silica glass in that region to produce an end surface 220 of the planar waveguide 155 as shown in FIG. 3D. The resulting circuit 150 illustrated in FIG. 3D has a recess 230 with the desired shape for providing the turning mirror configuration 10 of FIG. 1. The particular range of angles useable for the deflector surface 230 as well as the end surface 220 are those useable with conventional turning mirror configurations including such configurations described in, for example, U.S. Pat. Nos. 5,135,605 and 4,750,799.

Figure 4A:
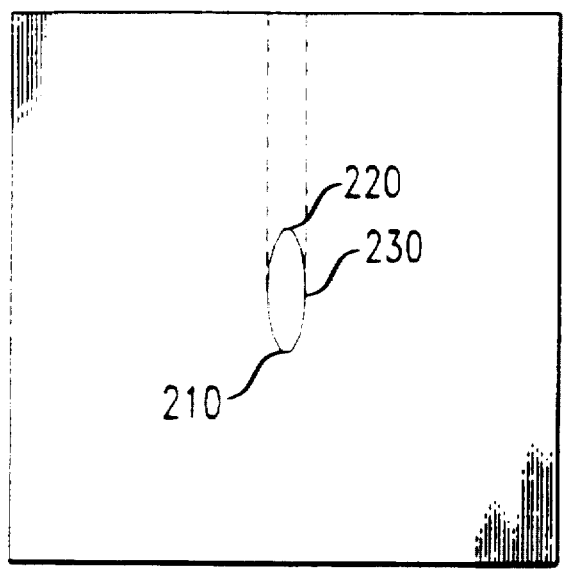
FIGS. 4A and 4B illustrate top views of different exemplary turning mirror recess configurations produceable in accordance with the invention.
Figure 4B:
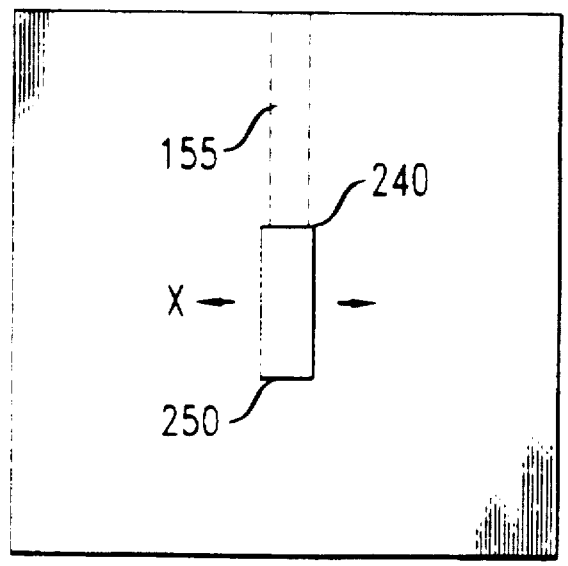

A top view of the recess 230 in FIG. 3D is illustrated in FIG. 4A. In FIG. 4A, the deflector surface 210 and waveguide end surface 220 forming the turning mirror configuration are shown substantially cylindrical due to the shape of a typically generated laser light beam. However, it is alternatively possible to produce such surfaces having different shapes including, for example, entirely or partially rectangular, cylindrical or variations thereof according to the invention by varying the shape and/or size of the light beam, and/or incident orientations of the light beam during the vaporization process. For example, as shown in FIG. 4, by moving the light beam 140 in a scanning or stepped manner across waveguide 155, such as in a direction X, the corresponding vaporization produces substantially rectangular deflector and/or waveguide end surfaces 240 and 250.

FIGS. 3A–3D depict the formation of the turning mirror using a single laser 130 of FIG. 2 for first forming the deflector surface 210 and then the waveguide end surface 220 for illustration purposes only. However, it is alternatively possible to form such turning mirror surfaces 210 and 220 in a different order, or substantially simultaneously by stepping or scanning the laser across the cladding layer in the region where the recess 230 is to be formed. Moreover, it is also possible to form such turning mirror surfaces 210 and 220 in an even more rapid manner using two or more lasers operating substantially simultaneously or sequentially. In such manner, one or more lasers are used to form the recess surface 210 while one or more other lasers are used to form the recess surface 220.

Further, in forming a turning mirror according to the invention, regions of the cladding layer 160 need only be vaporized to a depth that encompasses the optical waveguide 155. Thus, it is possible to regulate the energy of the light beam 140 and/or the time that the beam 140 is incident on the cladding layer 160 to achieve the desired vaporization depth. It is further possible to vaporize the cladding layer 160 to the depth of the substrate 165 in accordance with the invention as shown in FIG. 3D.

Moreover, the particular material selected for the substrate of the integrated optical circuit is not critical for practicing this aspect of the invention. However, according to a second aspect of the invention, it is desirable to employ a material for the substrate 165 that enables light wavelengths used to vaporize the cladding layer 160 to be substantially transmitted through the substrate. For example, if a silicon substrate were used with a silica glass cladding layer, then approximately 75% of light in the wavelength range of 5 μm and 12 μm would be transmitted through the substrate 165 while approximately 100% of such light wavelengths is absorbed by the cladding layer.

Thus, in accordance with the second aspect of the invention, it is possible to create the desired turning mirror recess with greater flexibility in the incident time and energy during the vaporization process. Such flexibility is afforded because it is possible to employ the substrate as a vaporization stop during the previously described vaporization of the cladding layer. More specifically, a light beam is directed incident on a cladding layer region for at least a duration of time that would vaporize substantially all the cladding layer in that region enabling the light beam to then be incident on the substrate under such region. However, the incident light beam on the substrate would produce little or no vaporization of the substrate material because the light wavelength used to vaporize the cladding layer is substantially transmitted through the substrate.

In an alternative turning mirror formation technique according to the second aspect of the invention, a light beam having sufficient energy in the particular wavelength range is directed incident on a cladding layer region until light in such wavelength range is detected exiting the substrate. Such detection indicates that substantially all the cladding layer material in the region has been vaporized and that the light beam is incident on the substrate. The incident light beam on the substrate is transmitted through the substrate and detected by the detector due to the material used for the substrate. Thus, a fabrication method in accordance with this aspect of the invention enables relatively rapid turning mirror formation at relatively low cost.

In addition, since the light beam includes wavelengths that are substantially transmitted through the substrate material, it is possible to direct the light beam incident on the cladding layer for the vaporization process by directing the beam through the substrate. Accordingly, it is possible to achieve an even more rapid turning mirror formation by directing a first light beam directly incident on the cladding layer and a second light beam incident on the cladding layer through the substrate. However, it should be readily understood that other substrate materials that are vaporized by a light beam of the particular light wavelength range are useable according to the first aspect of the invention. Also, it should be readily understood that the vaporization of the cladding layer in a region for forming a turning mirror need only extend to a depth including the planar waveguide and not necessarily to a depth exposing the substrate.

Figure 1:
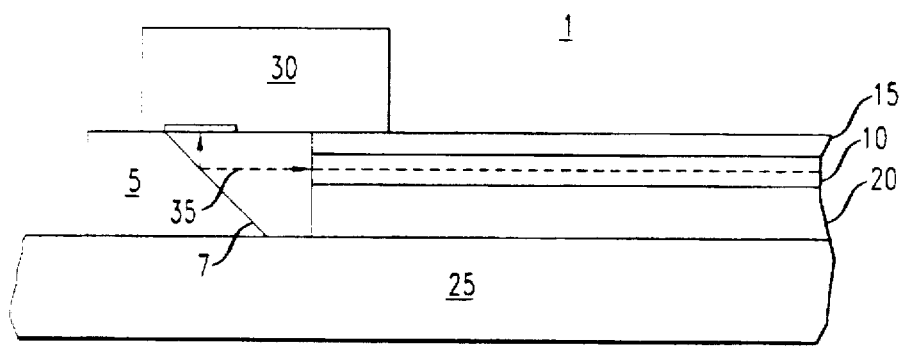
FIG. 1 illustrates a cross-sectional view of an exemplary turning mirror configuration in a conventional hybrid integrated optical circuit.

It is further possible to employ the method of the invention for forming alternative turning mirror configurations in addition to the conventional configurations depicted in FIGS. 1 and 3D. For instance, it is possible to employ the method of the invention for forming the advantageous turning mirror configuration described in the commonly-assigned patent application entitled "INTEGRATED OPTICAL CIRCUIT HAVING PLANAR WAVEGUIDE TURNING MIRRORS", co-filed herewith by D. Marcuse and H. M. Presby and incorporated by reference herein. A turning mirror configuration 300 in accordance with that co-filed patent application is shown in FIG. 5.

Figure 5:
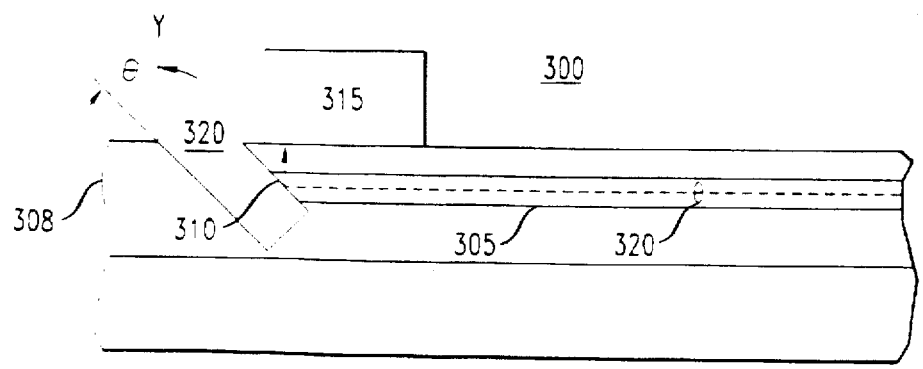
FIG. 5 illustrates a cross-sectional view of a hybrid integrated optical circuit with an alternative turning mirror configuration formed in accordance with the invention.

In FIG. 5, the integrated optical circuit 300 has a planar waveguide 305 formed within a cladding layer 308 with an end surface 310 advantageously used as a turning mirror deflector surface. This turning mirror deflector surface 310 enables the exchange of optical signals between the waveguide 305 and an active optical device 315, such as an optical signal detector or transmitter. Such optical signal deflection is achievable because (1) the waveguide deflector end surface 310 is positioned adjacent to a gap region recess 320 wherein the planar waveguide 305 and the region 320 have refractive indices in a ratio of approximately 1.3 or greater; and (2) the waveguide deflector end surface 310 is positioned relative to a Y-axis extending perpendicular to the direction of the waveguide at an angle in the range of 24° and 67°. An exemplary optical signal path between the active device 315 and waveguide 305 is indicated by a dashed-line 325.

It is possible to form the angled gap region 320 of the turning mirror configuration 300 using the advantageous vaporization technique of the present invention. More specifically, the gap region recess 320 is formed by directing a light beam having sufficient energy in a particular absorption wavelength range incident on a region of the circuit 300 at the angle θ. Such incident light beam is maintained for a duration to vaporize the cladding layer 308 to produce the angled gap region 320 in a substantially identical manner to that described above with regard to FIGS. 2 and 3A–3D.

Although several embodiments of the invention have been described in detail above, many modifications can be made without departing from the teaching thereof. All of such modifications are intended to be encompassed within the following claims. For instance, although the invention has been described with respect to planar waveguides formed within silica integrated optical circuits, it is possible for the invention to be implemented in integrated optical circuits formed of other materials including, for example, lithium niobate.

The invention claimed is:

1. A method of forming an optical circuit having a turning mirror comprising:

forming a planar waveguide within a cladding layer;

directing at least one light beam incident on a region of the cladding layer containing the planar waveguide, said beam including at least one wavelength in a particular wavelength range substantially absorbed by the cladding layer for vaporizing the cladding layer in the region, said vaporization producing a recess in the cladding layer wherein at least a portion of an edge surface of the formed recess provides an optical signal deflector surface, the light beam being incident on the cladding layer at at least one angle relative to the circuit to achieve a corresponding angle of deflection for the deflector surface.

2. The method of claim 1 wherein said cladding layer is formed on a substrate material that enables said light beam wavelength to be is substantially transmitted through said substrate material.

3. The method of claim 2 wherein said light beam wavelength employed in the light beam directing step is approximately in the range of 5 μm to 12 μm for the cladding layer comprising silica glass and the substrate comprising silicon.

4. The method of claim 3 wherein the light beam directing step uses a $CO_2$ laser for generating the light beam.

5. The method of claim 2 further comprising the steps of:

detecting light having said light beam wavelength transmitted through said substrate; and stopping said incident light beam upon such detection.

6. The method of claim 2 further comprising performing said light beam directing step for a sufficient duration to vaporize the cladding layer region to expose the substrate.

7. The method of claim 2 wherein the light beam directing step directs the light beam incident on the cladding layer through the substrate.

8. The method of claim 7 wherein the light beam directing step directs at least one light beam directly incident on the cladding layer and directs at least one other light beam incident on the cladding layer through the substrate.

9. The method of claim 1 wherein the light beam directing step forms an end surface of the planar waveguide as well as the deflector surface positioned as part of a recess edge surface opposite the formed waveguide end.

10. The method of claim 9 wherein the beam directing step directs at least one light beam for forming the planar waveguide end surface and at least one other light beam for forming the deflector surface.

11. The method of claim 9 wherein the formed planar end surface is formed by directing the light beam at an angle substantially perpendicular to a length of the planar waveguide.

12. The method of claim 1 wherein the light beam directing step forms the deflector surface as an end surface of the planar waveguide.

13. The method of claim 1 further comprising performing the light beam directing step until the formed recess extends to at least a depth that includes said planar waveguide.

* * * * *